United States Patent
Bates et al.

(10) Patent No.: US 10,945,106 B1
(45) Date of Patent: Mar. 9, 2021

(54) SYSTEMS AND METHODS FOR MANAGING TRANSPORTATION VEHICLE RESOURCES

(71) Applicant: Panasonic Avionics Corporation, Lake Forest, CA (US)

(72) Inventors: Steven Bates, Mission Viejo, CA (US); Philip Watson, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 16/546,203

(22) Filed: Aug. 20, 2019

(51) Int. Cl.
- *H04W 4/42* (2018.01)
- *G06Q 10/02* (2012.01)
- *G08B 5/22* (2006.01)

(52) U.S. Cl.
CPC .............. *H04W 4/42* (2018.02); *G06Q 10/02* (2013.01); *G08B 5/221* (2013.01)

(58) Field of Classification Search
CPC ....... H04W 4/024; H04W 4/42; H04W 4/025; A47F 10/04; B60R 2021/0093; B64D 11/0015; G08B 13/2462; G08B 885/221; G06Q 10/02

See application file for complete search history.

(56) References Cited

U.S. PATENT DOCUMENTS

| | | | |
|---|---|---|---|
| 8,806,543 B1 | 8/2014 | Curtis et al. | |
| 9,380,428 B1 * | 6/2016 | Dame | H04B 7/18504 |
| 2003/0160497 A1 * | 8/2003 | Darr | B60R 22/321 |
| | | | 297/468 |
| 2007/0241927 A1 * | 10/2007 | Ratnakar | G06Q 10/02 |
| | | | 340/4.6 |
| 2015/0127496 A1 * | 5/2015 | Marathe | G06Q 10/087 |
| | | | 705/28 |

FOREIGN PATENT DOCUMENTS

| | | |
|---|---|---|
| CN | 109625024 | 4/2019 |
| KR | 20180117052 | 10/2018 |

* cited by examiner

*Primary Examiner* — Yuwen Pan
*Assistant Examiner* — Umair Ahsan
(74) *Attorney, Agent, or Firm* — Klein, O'Neill & Singh, LLP

(57) ABSTRACT

Methods and systems are provided for a transportation vehicle. One method includes detecting a location of a personal electronic device (PED) on a transportation vehicle based on a signal transmitted by a wireless beacon to the PED; using sensor data to automatically determine usage of a resource on the transportation vehicle, the resource including on the transportation vehicle at least one of a lavatory, a passenger seat, a luggage bin, and a cart; indicating a status of the resource to the PED based on the determined usage; and updating a data store for tracking the usage, after an action is taken associated with the resource, in response to receiving the status.

20 Claims, 17 Drawing Sheets ions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).
SYSTEMS AND METHODS FOR MANAGING TRANSPORTATION VEHICLE RESOURCES

TECHNICAL FIELD

The present disclosure relates to transportation vehicles in general, and more particularly, to systems and methods for managing resources and facilities on transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

As technology continues to evolve for transportation vehicles, it is desirable to improve passenger travel experience by providing passengers with technical solutions that enable passengers to access and use resources on transportation vehicles. Continuous efforts are being made to develop such technology for improving passenger experience on transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

Figure 1A:
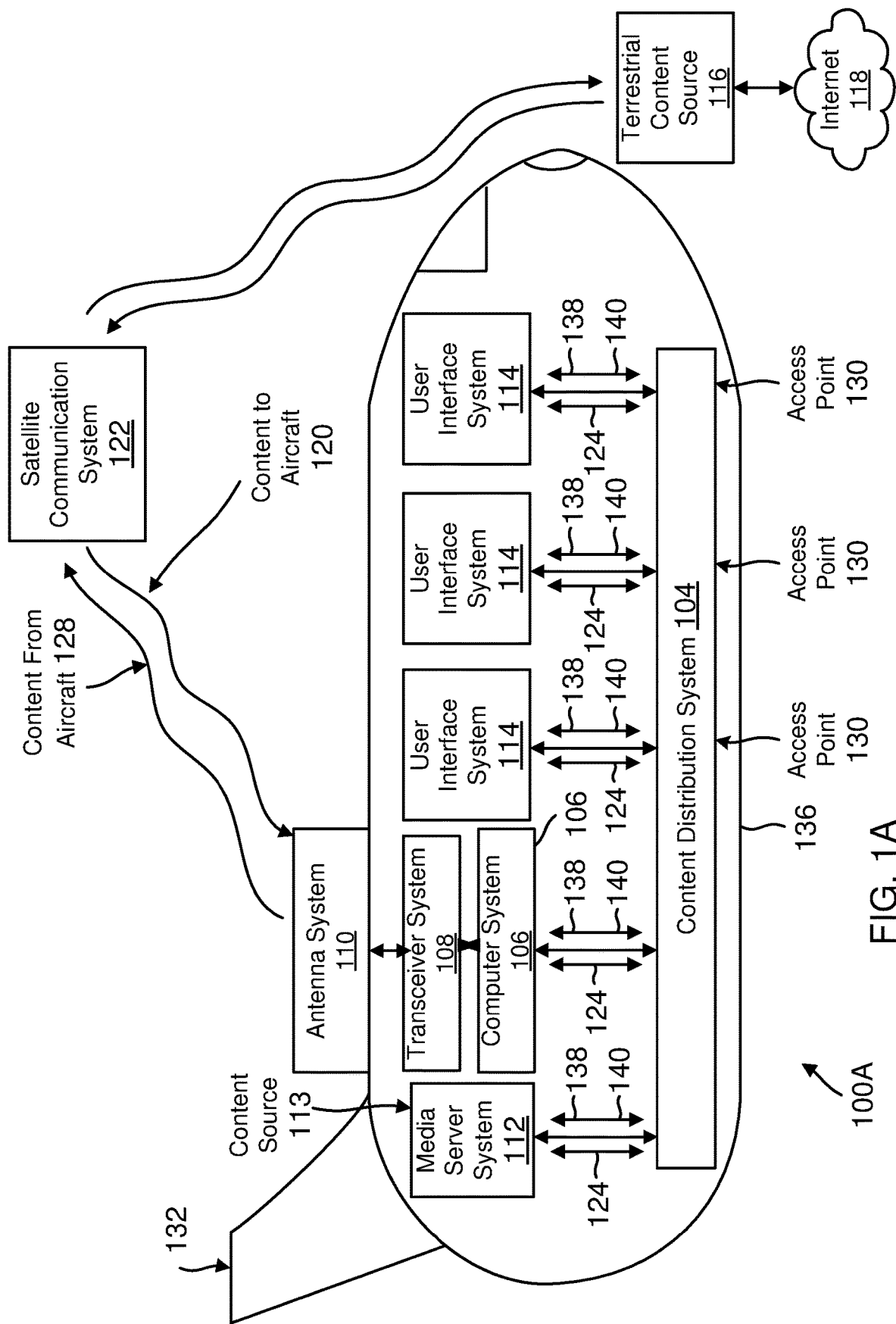
FIG. 1A shows an example of an operating environment for implementing the various aspects of the present disclosure on an aircraft.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computing device.

By way of illustration, both an application running on a computing device and the computing device can be a component. One or more components may reside within a process and/or thread of execution, and a component may be localized on one computer and/or distributed between two or more computer devices. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, innovative computing technology is provided for an on-board vehicle mapping system and associated methods thereof. The system is configured to use wireless directional beacon markers (e.g. 320A-320N, FIG. 3A), one or more sensor systems, and a software application (e.g. 314, FIG. 3A) downloaded/installed on a Personnel Electronic Device (PED) (e.g. 302, FIG. 3A) and/or In-Flight Entertainment (IFE) system seatback monitor (SM) (or seat device) (e.g. 326, FIG. 3A) and/or cabin management interface (CMI) (e.g. 318, FIG. 3A). The system alerts and informs (e.g. by a buzzer, a SMS (Short Message Service) text message, an email, an electronic screen display, one or more icons, or the like) each passenger and crew member of on-board vehicle area mapping and directional information about or to one or more of the following: location of passenger seats (e.g., row 23, seat 25), individuals status (e.g. row 26, seat 30 occupied, row 33, seat 30 unoccupied), individual luggage bins (e.g., bin 15 open, bin 13 closed, bin 5 filled), galley cart contents availability (e.g., chicken sandwich, 20 left, whiskey 100 bottles left, vodka, 30 bottles left, and the like), seat belts (e.g., row 15, seat 7, connected, row 19, seat 22, unconnected), lavatory status (e.g., #1 lavatory occupied/#2 lavatory available), toilet seat (e.g., #1 lavatory seat up/#2 lavatory seat down), and number of people standing in crew/galley storage area (e.g., 5 persons standing waiting for lavatories). Details regarding the innovative computing technology are provided below.

Vehicle Information System: FIG. 1A shows an example of a vehicle information system 100A (also referred to as system 100A) that can be configured for installation aboard an aircraft 132 for providing an on-board mapping system, according to one aspect of the present disclosure. When installed on an aircraft, system 100A can comprise an aircraft passenger IFE system, such as the Series 2000, 3000, eFX, eX1, eX2, eX3, eXW, NEXT, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications.

System 100A and the terrestrial content source 116, for example, can communicate directly and/or indirectly via an intermediate communication system, such as a satellite communication system 122.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to the access point 130 that provides a wired and/or a wireless connection for the user interface system.

In at least one aspect, the user interface system 114 comprises a software application that a user downloads and installs on a PED to receive and view content via an access point 130, described below in detail. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, an application programming interface (API), one or more pushbuttons, such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 1B:
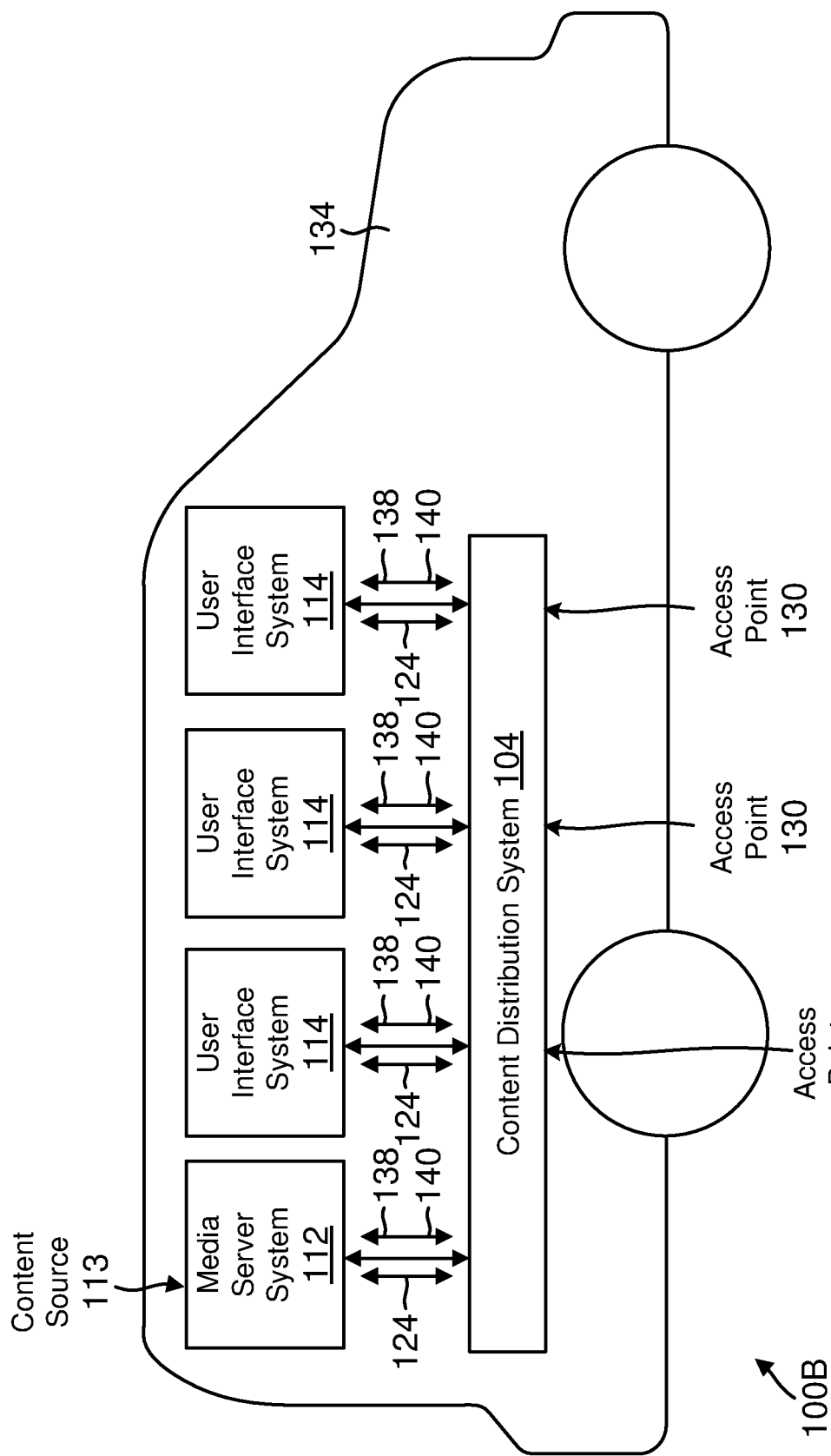
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
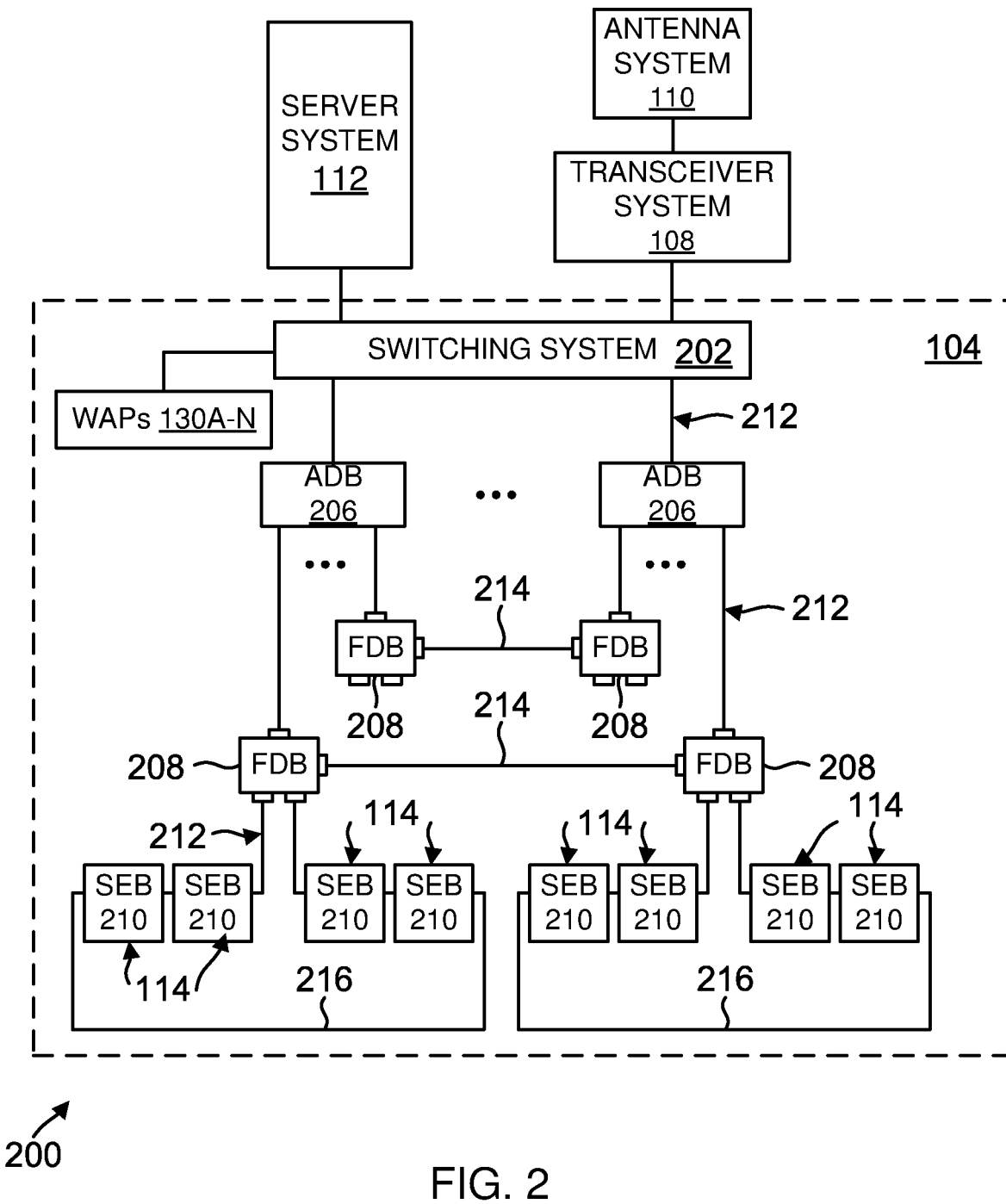
FIG. 2 shows an example of a content distribution system, used according to one aspect of the present disclosure.

Content Distribution System: FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired. Exemplary as used herein means an example and does not imply an ideal or a preferred embodiment.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
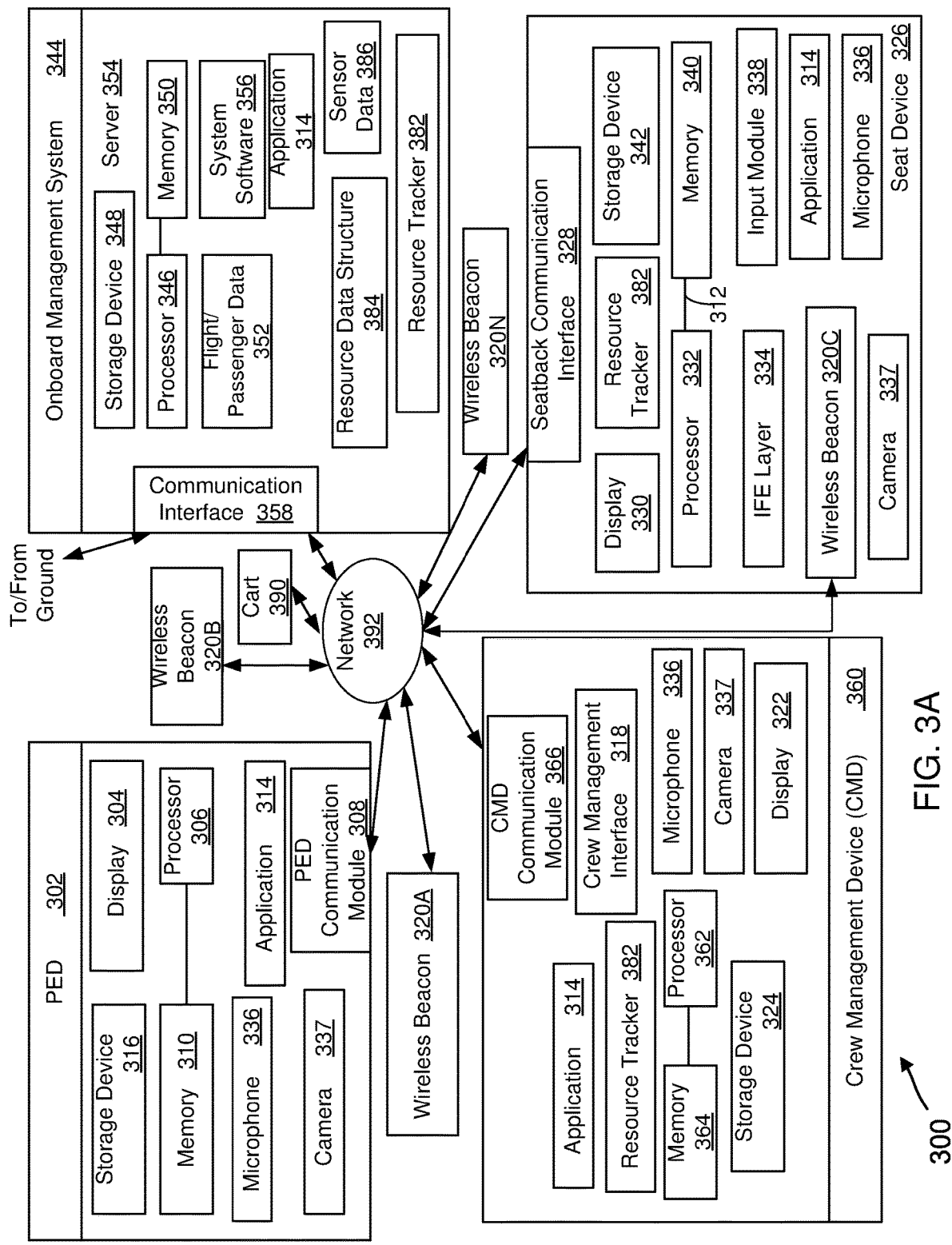
FIG. 3A shows an example of an overall mapping system for managing resources on an aircraft, according to one aspect of the present disclosure.

System 300: FIG. 3A shows an example of a system 300 for an aircraft (or any other transportation vehicle) that includes a mapping system for enabling passengers to better access resources on the aircraft and improve overall travel experience, according to one aspect of the present disclosure. In one aspect, system 300 includes, the PED 302, an onboard management system 344, the seat device 326, a crew management device (may be referred to as "CMD") 360 and a plurality of wireless directional beacon markers 320A-320N (referred to as "wireless beacons 320" or "beacons 320"). In another aspect, system 300 may not include a seat device 326. The onboard management system 344 may be similar to computer system 106 and/or server 112 described above with respect to FIGS. 1A/1B.

In one aspect, the beacons 320A-320N may be Bluetooth beacons that are installed throughout the aircraft. The beacons 320A-320N typically broadcast unique titer identifiers to networked devices (e.g. PED 302, CMD 360 and others) that are close to the beacons. This enables the PED 302 executing application 314 to determine its location within the aircraft. This information is used for accessing a plural of resources, e.g. lavatories, luggage bins, obtain information regarding catering carts, seat belts and others, as described below in detail.

In one aspect, PED 302 may be a mobile phone, a notebook, a tablet, a laptop or any other computing device. PED 302 may include a processor 306 that has access to a memory 310 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving a voice input from a passenger for interfacing with application 314, according to one aspect of the present disclosure. The voice input may be converted into text by application 314. In another aspect, PED 302 may also include a camera 337 that may be used by a passenger to upload a video to interface with a crew member or any other passenger.

The PED 302 includes a storage device 316 that may be, or may include any storage medium for storing data in a non-volatile manner, such as one or more magnetic or optical based disks, flash memory, or solid-state drive. The storage device 316 may be used to store content displayed on a display screen 304 of PED 302. In one aspect, display 304 may include a touch screen for receiving input commands.

The storage device 316 may also store the application 314 that is executed out of memory 310. Application 314 may be used to pair the PED 302 with the aircraft systems to receive content and communicate with aircraft crew. Application 314 may also be configured to receive notifications and alerts regarding different resources generated based on PED 302 location detected by using signals from beacons 320A-320N.

In one aspect, application 314 may be made available for download and installation via a public repository such as that maintained respectively under the trademark GOOGLE PLAY by Google, Inc. and/or the APP STORE maintained by Apple Inc. In addition, application 314 may be provided for download by an airline carrier on a website or from the onboard management system 344.

In one aspect, PED 302 uses a PED communication module 308 to communicate with a network 392. In one aspect, PED communication module 308 may include one or more interfaces to communicate with different devices connected to network 392, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In one aspect, the seat device 326 includes a display device 330, a processor 332, a memory 340, a communication interface 328 and a local storage device 342 for storing content. The seat device 326 receives user input/requests via an input module 338. The input module 338 may be configured to use a local touch screen included with display 330, a local virtual keyboard, an external mouse, external keyboard or any other input device.

Processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 that provides in-flight entertainment and other options to users. The IFE layer 334 provides audio/video content as well as controls for accessing content. The IFE layer 334 uses the communication interface 328 to interface with the PED 302 and/or onboard management system 344 via the network 392. The communication interface 328 includes logic and circuitry for interfacing with the onboard management system 344 and/or PED 302. In one aspect, the communication interface 328 may use a wireless and/or wired connection for such communication.

In one aspect, the seat device 326 may also execute the application 314 to interface with CMD 360 and other devices. The application 314 when executed by the seat device 326 may have different functionality compared to when application 314 is executed by the PED 302.

In one aspect, the seat device 326 may also execute a resource tracker 382 that receives sensor data from various sensors throughout the aircraft regarding different resources and alerts PED 302 regarding usage of the different resources, as described below.

In one aspect, the seat device 326 may also include beacon 320C that generate a signal to detect a location of the PED 302 within an aircraft. The location information may be used for providing access to resources, as described below in detail. The beacon 320C in a seat device 326 may comprise a standard Bluetooth module included with the seat device with the Bluetooth module operated as a beacon.

In one aspect, the seat device 326 on the aircraft may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the onboard management system 344 includes a server 354 (similar to the media server 112 and/or computer system 106). The server 354 includes a processor 346 that has access to a memory 350 via a bus system/interconnect (similar to 312). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data in a data store and/or database (for example, passenger data 352, resource data structure 384, sensor data 386 or any other information) applications and program files, including system software 356, application 314, resource tracker 382 and others.

System software 356 of the onboard management system 344 is executed by the processor 346 to control the overall operation of the server 354 including monitoring the status of network connections to ground systems. Application 314 may be downloaded by passengers using an authorized PED 302 for accessing digital content.

In one aspect, the onboard management system 344 maintains flight and passenger data 352 (may also be referred to as data 352), for example, flight itinerary including origin location, layover locations, destination location, language preference for translating messages from one language to another, arrival time and other information. Data 352 may also include passenger data that identifies each passenger for a flight, a seat assigned to a passenger, a language preference for the passenger, passenger preferences as to food and drinks and any other information. Data 352 may be retrieved from an airline ground system (not shown) before flight departure and may be updated during flight.

In one aspect, server 354 uses network 392 to communicate with CMD 360, PED 302 and/or seat device 326 via a communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2.

In another aspect, server 344 executes the resource tracker 382 and maintains the resource data structure 384 that is described below in detail. Sensor data 386 may be received from various sensors located throughout the aircraft, including sensors at seats, toilets, luggage bins, a cart (e.g. a catering or galley cart) 390, and other locations. Details regarding resource tracker 382 are provided below with respect to FIG. 3C.

In one aspect, CMD 360 may be a mobile phone, a notebook, a tablet, a laptop, fixed crew panel/terminal or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

CMD 360 may also include a microphone 336 for receiving a voice input from a crew member, according to one aspect of the present disclosure. The voice input may be used to communicate with another crew member or a passenger.

In one aspect, CMD 360 includes a display 322 to display information. Display 322 may also include a touch screen for receiving input commands. Display 322 may also be used to receive messages from passengers.

The CMD 360 includes a storage device 324 that may be, or may include any storage medium for storing data in a non-volatile manner, such as one or more magnetic or optical based disks, flash memory, or solid-state drive. The storage device 316 may be used to store a crew management interface (CMI) 318 that may be executed out of memory 364.

The CMI 318 enables the CMD 360 to interface with the onboard management system 344 using network 392 via a CMD communication module 366. In one aspect, the CMD communication module 366 is also used to communicate with the seat device 326, when installed, and one or more PEDs 302. In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In one aspect, beacons 320A-320N enable application 314 to determine location of the PED 302 location within the aircraft to direct a passenger to their desired destination (e.g. open lavatory, or back to their assigned seat). In one aspect, an aircraft map (e.g. 373, FIG. 3B) is installed at PED 302, for example, using application 314. The map may be downloaded on the aircraft from server 344 or prior to the flight. The passenger's seat may be indicated on the map, when the PED 302 is paired with the seat device 326 or when application 314 has the passenger reservation details. Details regarding the use of location information are provided below.

Figure 3B:
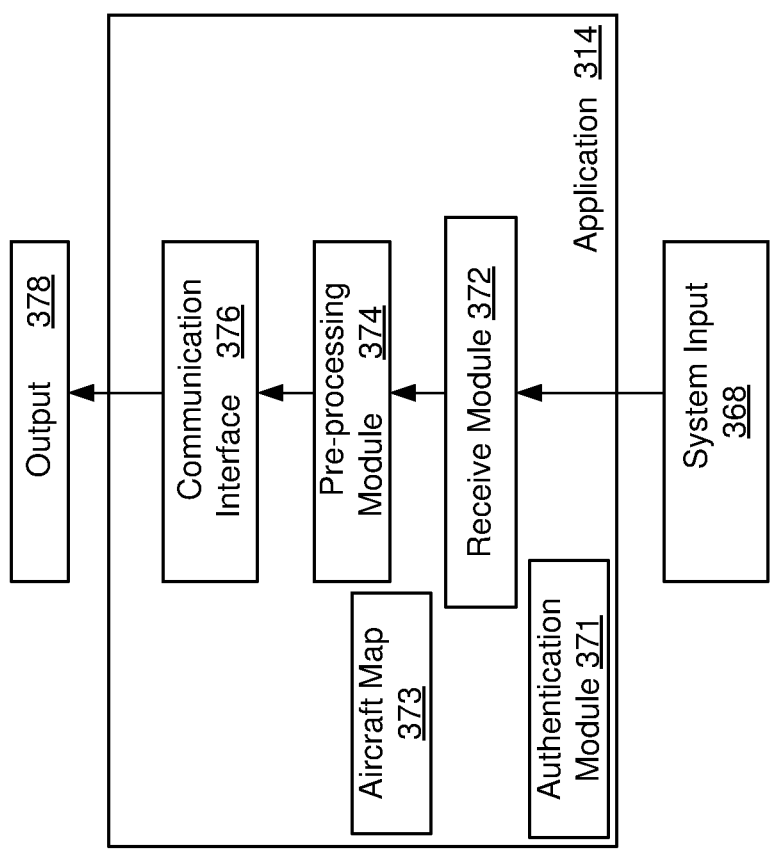
FIG. 3B shows a block diagram of an application used in the system of FIG. 3A, according to one aspect of the present disclosure.

Application 314: FIG. 3B shows an example of application 314, according to one aspect of the present disclosure. In one aspect, application 314 is executed out of PED 302. However, application 314 may also be executed from the seat device 326 or by CMD 360.

In one aspect, application 314 includes an authentication module 371 that authenticates the PED 302 for pairing the PED 302 with the IFE layer 334. This enables the PED 302 to communicate with the seat device 326. The authentication may be based on using a password, biometrics or any other technique.

In one aspect, application 314 includes or has access to an aircraft map 373. Map 373 may be used to indicate location of different resources on the aircraft, based on the location of the PED 302.

In one aspect, application 314 includes a receive module 372 that receives a system input 368. The system input 368 may include location information of the PED 302 within the aircraft, as discussed below. The receive module 372 provides the system input 368 to a pre-processing module 374. The pre-processing module 374 pre-processes the input. The pre-processing is based on the type of input. For example, if the input is provided as text, then the pre-processing module 374 extracts the information from the text and provides that to a communication interface 376 that generates an output 378. The output 378 from application 314 is provided to the user and may include information regarding various resources that are tracked by the resource tracker 382, as described below with respect to FIG. 3C.

Figure 3C:
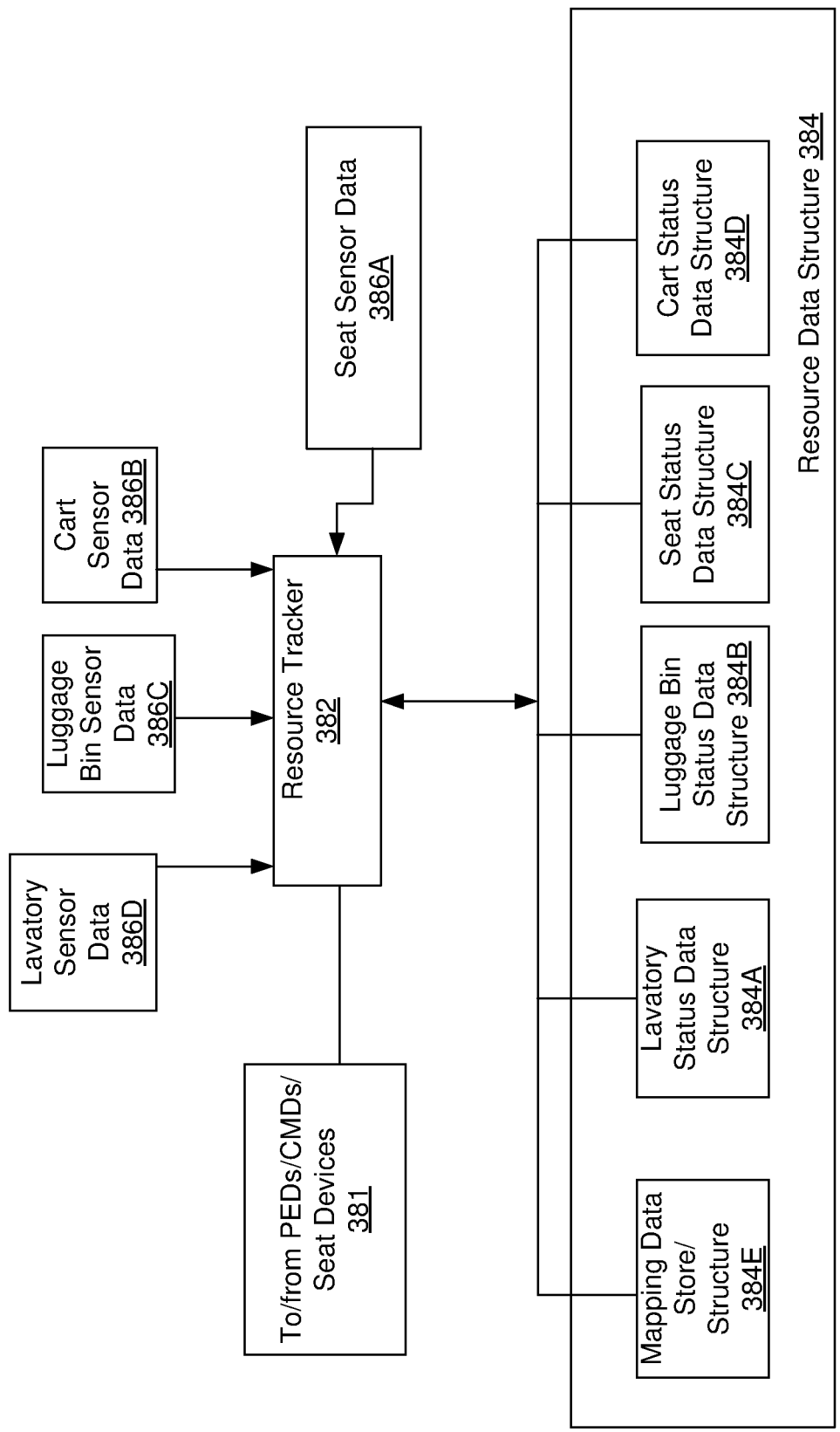
FIG. 3C shows a block diagram of a resource tracker used by the system of FIG. 3A, according to one aspect of the present disclosure.

Resource Tracker 382: FIG. 3C shows an example of the resource tracker 382 that uses sensor data 386A-386D from various sensors located at least at a lavatory (not shown), luggage bins (not shown), cart 390, and a passenger seat to track usage of the various resources and provide an alert 381 to one or more of PED 302, seat device 326, CMD 360 or any other device. The sensor data 386A-386D is used by the resource tracker 382 to perform various functions associated with these resources, as described below. The resource tracker 382 maintains the resource data structure 384 that may include a lavatory status data structure 384A, luggage bin status data structure 384B, seat status data structure 384C, cart status data structure 384D, and a mapping data store/structure 384E. The mapping data store 384E is a map of resources on the vehicle, such as lavatories, luggage bins, galley carts, and etc. It is noteworthy that the separate data structures are shown as an example, the adaptive aspects of the present disclosure may be implemented using a single data structure 384 with structured or unstructured data. Alternatively, a location map for each resource may be included with the data structure for that particular resource as opposed to separately storing mapping data. The use and technical impact of these different data structures are described below with respect to the various process flows of FIGS. 4A-4J.

Figure 3D:
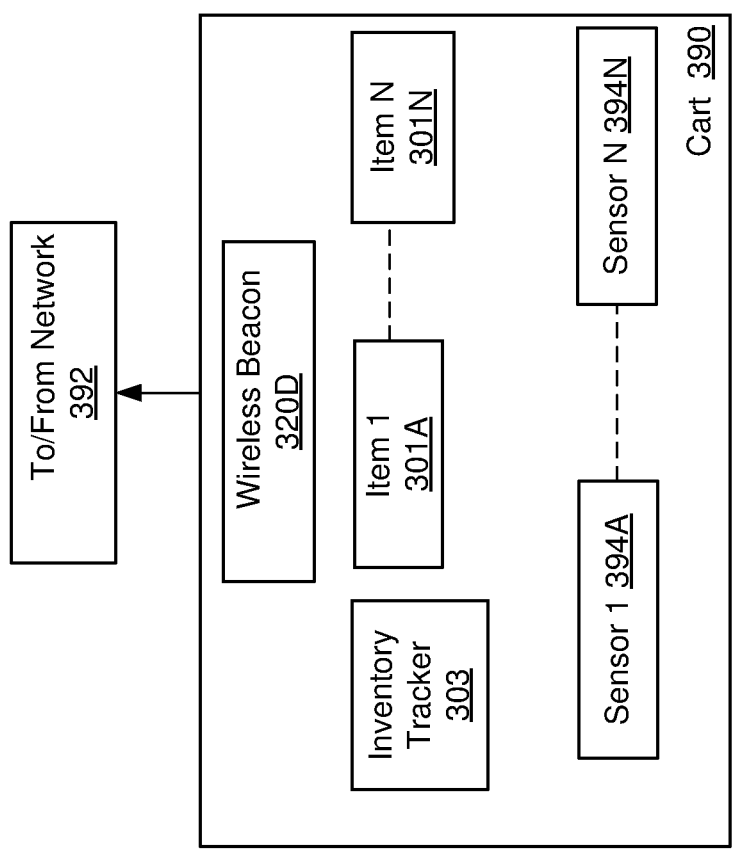
FIG. 3D shows a block diagram of a cart used on a transportation vehicle, according to one aspect of the present disclosure.

Cart 390: FIG. 3D shows a block diagram of a catering or galley cart 390 (may also be referred to as cart 390), according to one aspect of the present disclosure. Cart 390 may be used on an aircraft for providing food, drinks or other items to passengers (shown as items 301A-301N). The various items 301A-301N are tracked by an inventory tracker 303. The inventory tracker 303 may be executed by a computing device that may be located at cart 390 or any other location. In another aspect, cart inventory may be maintained by scanning each item 301A-301N. Cart 390 also includes a wireless beacon 390D that communicates cart location within the aircraft via network 392. Cart 390 may also include various sensors 394A-394N that detect when an item has been provided to a customer. This information may be used to notify application 314 when a certain item is likely to become unavailable, as described below in detail.

Figure 4A:
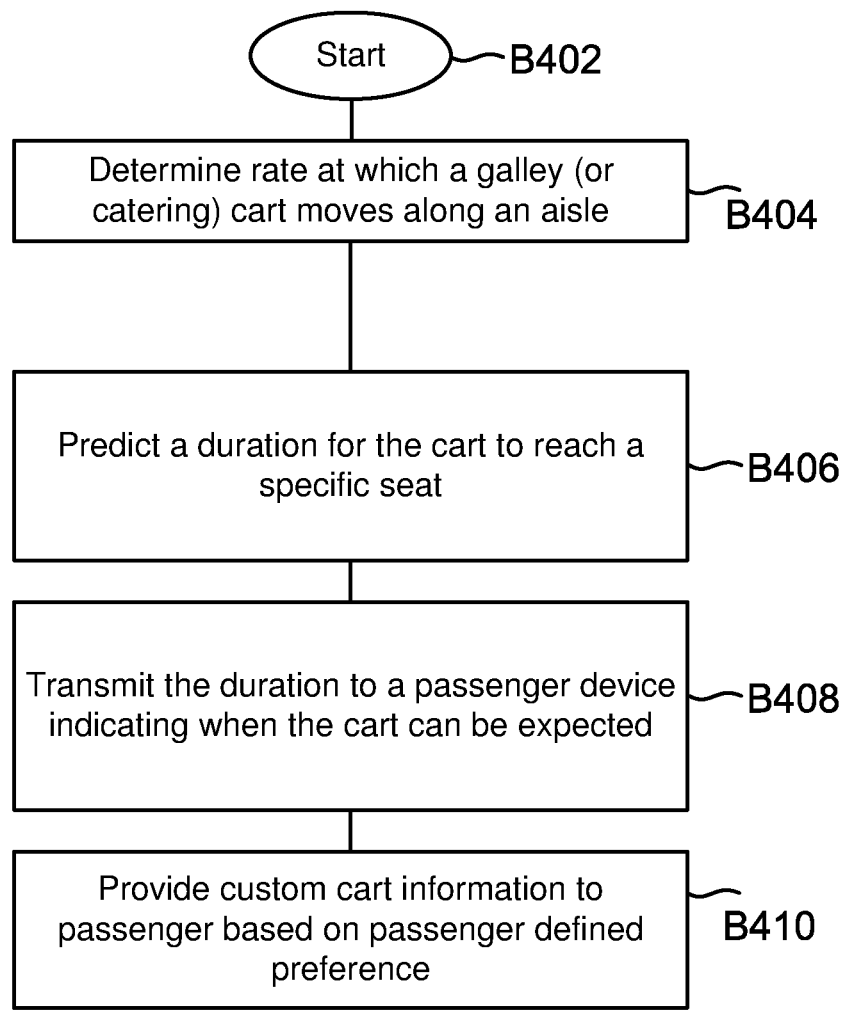
FIG. 4A shows a process flow diagram for managing galley cart usage on an aircraft, according to one aspect of the present disclosure.

Process Flow: FIG. 4A shows a process 400 for tracking and managing cart 390, according to one aspect of the present disclosure. In one aspect, by installing the beacon 320D at cart 390, the resource tracker 382 is aware of the cart's location within the aircraft at any given time. Sometimes a passenger may desire a drink or food, but cannot see the cart 390. The resource tracker 382 notifies the passenger of the cart location based on information received from beacon 320D. Based on a rate at which the cart is moving, the resource tracker 382 is configured to predict a duration as to when the cart would reach a specific seat location.

In another aspect, when cart 390 has automated inventory checking (or the airline crew scans every item as they remove an item, when all items are for purchase), the resource tracker 382 provides an inventory status of the cart 390 to the passengers, e.g. "only one hamburger left. Order now!" or "Sorry, no more chicken parmesan. Would you like beef stroganoff?"

Referring now to FIG. 4A, process 400 is performed by executing program instructions out of a memory device. The process begins in block B402, when the cart 390, PED 302, CMD 360, server 354 and seat device 326 have been initialized and are operational. In one aspect, not all the components may be operational, and the innovative technology can be implemented using, for example, the cart 390 and resource tracker 382 that may be executed out of CMD 360, server 354 or seat device 326. The adaptive aspects disclosed herein are not limited to any specific location for executing the code for process 400.

As the cart 390 moves through an aircraft aisle, in block B404, the resource tracker 382 determines a rate at which the cart is moving. The resource tracker 382 also receives cart sensor data 386B to track cart inventory. In block B406, the resource tracker 382 uses the rate at which the cart is moving to compute a duration for the cart 390 to reach a specific seat location. The duration may be transmitted to different PEDs 302 and/or seat devices 326 indicating when the cart 390 can be expected. In addition to the duration, in block B410, the resource tracker 382 provides information regarding the items that are available and/or unavailable to a passenger. This information may be customized based on passenger preferences indicated via application 314 and passenger data 352.

Figure 4B:
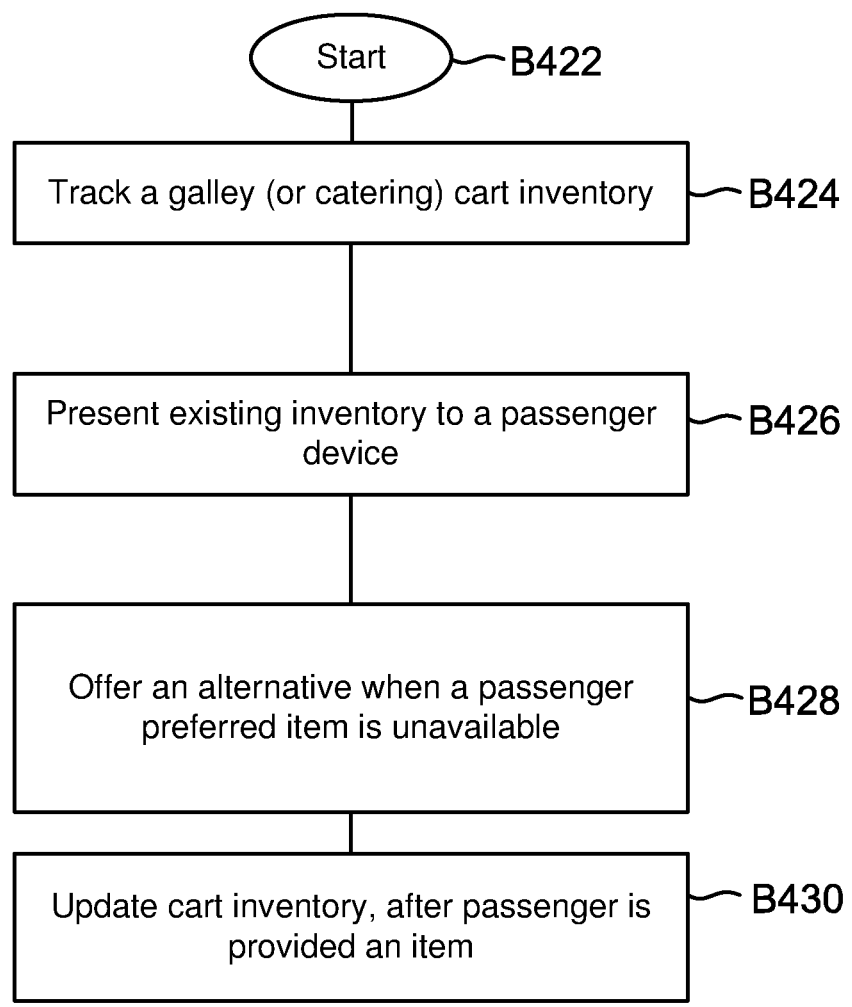
FIG. 4B shows a process flow diagram for managing galley cart inventory on an aircraft, according to one aspect of the present disclosure.

FIG. 4B shows another process 420 for tracking and managing cart 390, according to one aspect of the present disclosure. The process begins in block B422, when the cart 390, PED 302, CMD 360, server 354 and seat device 326 have been initialized and are operational. In one aspect, not all the components may be operational, and the innovative technology can be implemented using, for example, the cart 390 and resource tracker 382 that may be executed out of CMD 360, server 354 or seat device 326. The adaptive aspects disclosed herein are not limited to any specific location for executing the code for process 420.

In block B424, the inventory tracker 303 executing programming instructions tracks the overall cart inventory. The inventory tracker 303 tracks the items that are present in cart 390 and also predicts the items that may become unavailable with reference to a particular seat location. The prediction may be based on using machine learning techniques that track how passengers consume certain items. The machine learning techniques also use specific passenger preferences to predict when an item may run out before the cart 390 reaches a certain seat.

In block B426, existing inventory and predicted inventory is provided to a passenger via application 314. In block B428, the passenger is offered an alternative choice when a passenger preferred item is unavailable or may become unavailable. For example, if the passenger had indicated that the passenger likes a certain type of soda in passenger data 352, the passenger may be presented a different soda type. If the passenger accepts the alternative item, then the cart inventory is updated in block B430.

Figure 4C:
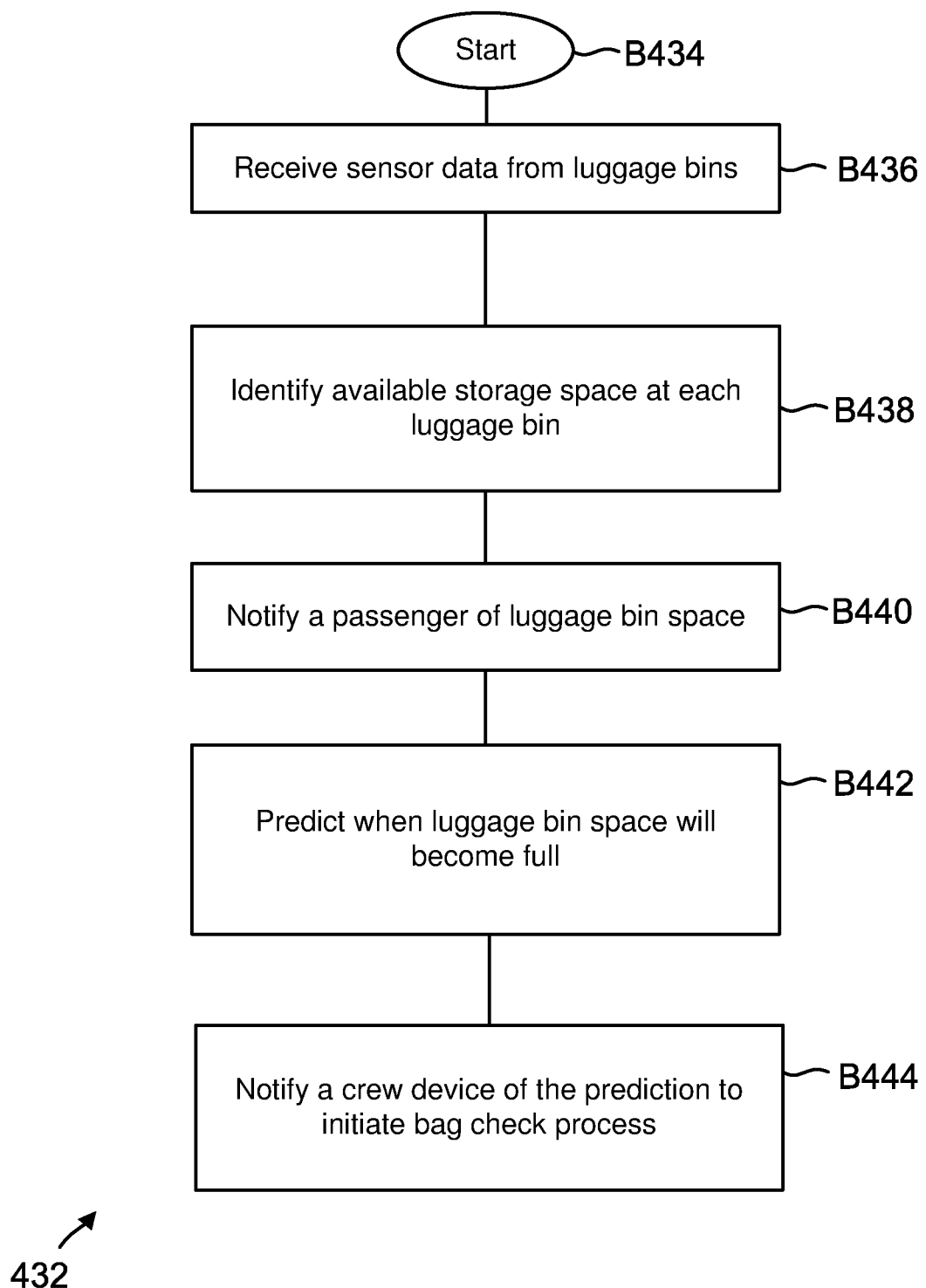
FIG. 4C shows a process flow diagram for managing luggage bin space on an aircraft, according to one aspect of the present disclosure.

FIG. 4C shows a process 432 for managing luggage bin space, according to one aspect of the present disclosure. In one aspect, the luggage bins are equipped with door sensors (not shown) that generate luggage bin sensor data 386C. The sensors could be wired to onboard management system 344, or may be wireless sensors transmitting to a central receiver (Wi-Fi, Bluetooth, Zigbee and others). This enables crew members to see which luggage bins are shut (and implied to be full) even when they cannot see all bins of an aisle. In one aspect, the sensors may be infra-red (IR) sensors to indicate actual full or partially full luggage bin status. Other types of known detection sensing may used as well, such as low power RADAR or acoustic sensing.

When the luggage bins become full or are about to become full, the technology disclosed herein notifies a gate attendant so they can inform passengers waiting to board to check bags with a gate attendant.

Referring back to FIG. 4C, process 432 is performed by executing program instructions out of a memory device. The process begins in block B434, when PED 302, CMD 360, server 354 and seat device 326 have been initialized and are operational. In one aspect, not all the components may be operational, and the innovative technology can be implemented using, for example, resource tracker 382 that may be executed out of CMD 360, server 354 or seat device 326. The adaptive aspects disclosed herein are not limited to any specific location for executing the code for process 432.

In block B436, luggage bin sensor data 386C is received by the resource tracker 382. The sensor data indicates the amount of space that is occupied and unoccupied. In block B438, available storage space is identified by the resource tracker 382. A passenger PED 302 and/or crew device 360 is notified of available bin space and bin location in block B440. In block B442, the resource tracker 382 may also predict when the luggage bin would become full. This may be determined based on the number of passengers that may be located in an aisle waiting to get seated. The resource tracker 382 may use machine learning techniques to make that prediction. Based on the prediction, in block B444, CMD 360 and/or a gate attendant device (not shown) is notified so that a bag check process can be started. This enables an airline to efficiently process passenger carry-on baggage.

Figure 4D:
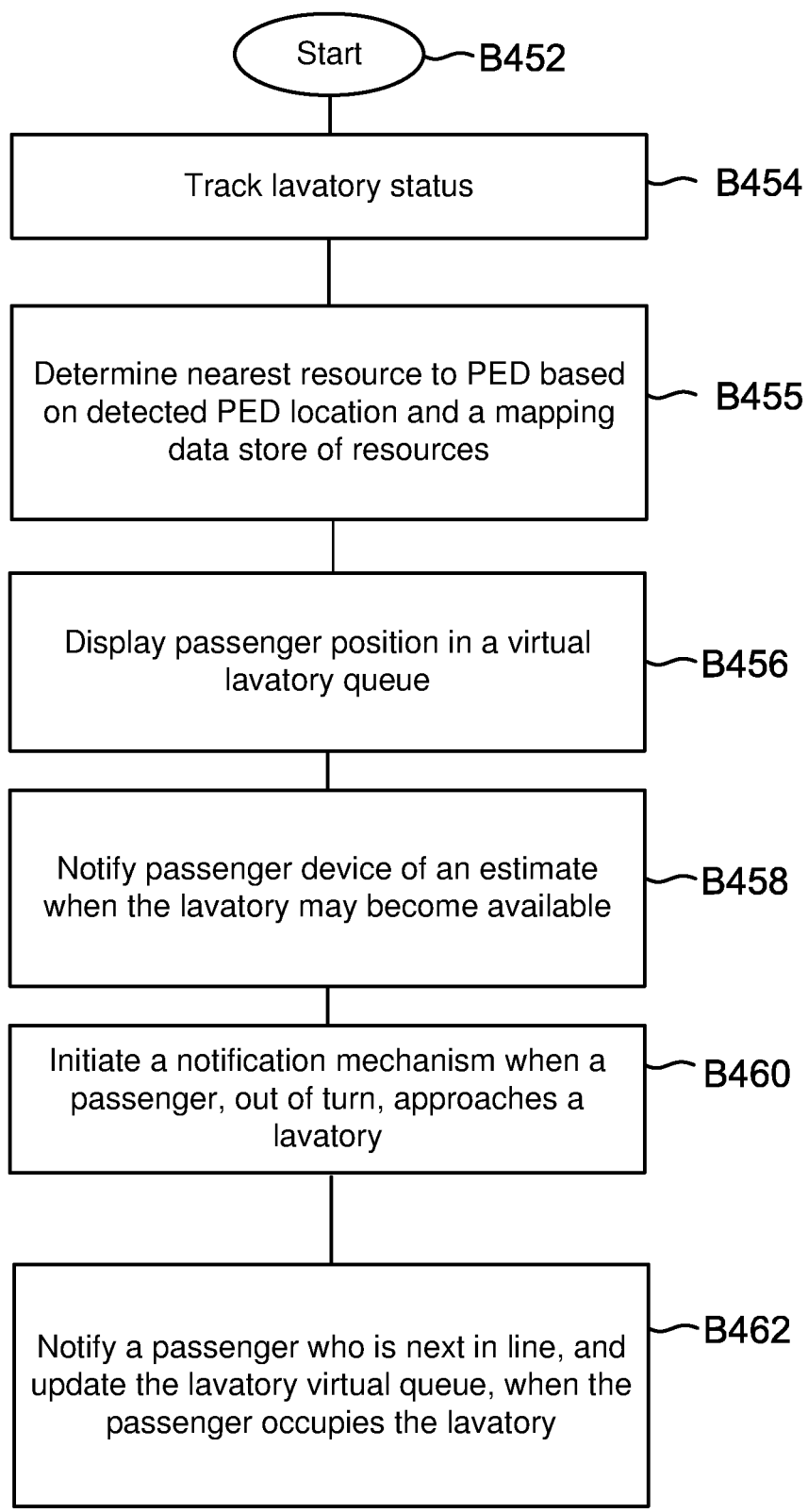
FIG. 4D shows a process flow diagram for managing lavatory usage on an aircraft, according to one aspect of the present disclosure.

FIG. 4D shows a process 450 for managing lavatories on an aircraft, according to one aspect of the present disclosure. In one aspect, the computing technology used in process 450 enables resource tracker 382 to transmit lavatory status (i.e. occupied/available) to the PED 302 and/or the seat device 326 with the nearest available lavatory drawn on a map. This is based on the resource tracker 382 monitoring the lavatories and communicating either directly to the PED 302 and/or the seat device 326 or a public overhead display (not shown). The process 450 includes determining the nearest resource (lavatory) to the PED based on detected PED location and a mapping data store of resources on the vehicle (lavatories, luggage bins, galley carts and etc.) Notification and direction to the nearest resource may indicate and identify available and unavailable resources (nearest occupied lavatory versus nearest unoccupied lavatory or full luggage bins vs. luggage bins with storage space available). Some resources are mobile, such as galley carts in which the position of the resource is tracked and the mapping data store updated as position of the resource within the vehicle changes.

To avoid passengers queued up for a lavatory, an electronic virtual queuing system is used by the resource tracker 382 such that passengers waiting for a lavatory can see the length of a queue and their position in the queue. Passengers may enter the queue via application 314 at the PED 302 and/or the seat device 326. If an alternative unoccupied lavatory is available, the resource tracker may recommend the unoccupied lavatory if it is within the same section of the cabin the passenger is seated in.

In one aspect, a passenger may be provided a Bluetooth-connected buzzer (not shown) that would notify the passenger when their position becomes available. The buzzers may be dispensed by crew members or via an automated dispenser. If a passenger in the queue does not use their position within a time-out period, the passenger loses their position and their slot is assigned to another passenger. To ensure that the next queued passenger gets the lavatory, the lavatory doors may be electrically locked (even when empty) and only unlocked via the PED 302 or the buzzer.

Referring back to FIG. 4D, process 450 is performed by executing program instructions out of a memory device. The process begins in block B452, when PED 302, CMD 360, server 354 and seat device 326 have been initialized and are operational. In one aspect, not all the components may be operational, and the innovative technology can be implemented using, for example, resource tracker 382 that may be executed out of server 354 or seat device 326. The adaptive aspects disclosed herein are not limited to any specific location for executing the code for process 450.

In block B454, resource tracker 382 tracks lavatory status, i.e. whether the lavatory is being used or is available. This may be determined based on lavatory sensor data 386D that is used to update lavatory status data structure 384A. In one aspect, a virtual queue is maintained by application 314, either at PED 302, seat device 326 or both. A passenger may submit a request to enter the virtual queue based on a text or audio input. The passenger's position in the virtual queue is displayed at block B456. The position may be displayed at PED 302, seat device 326 or both. The resource tracker 382 tracks the different lavatory usage requests and lavatory status at lavatory data structure 384A.

In block B458, the passenger is notified of an estimated time when the lavatory may become available for the passenger. This estimate is again based on machine learning techniques that are used to predict the estimated time for availability. The resource tracker 382 tracks lavatory usage by various passengers on different routes. The data structure 384A is continuously updated to accurately predict an estimated time. If a passenger approaches the lavatory before the passenger's turn, then the PED 302 may be issue a warning to indicate to the passenger that the lavatory is still unavailable. The notification may be generated on PED 302 in block B460.

In block B462, the passenger who is next in line is notified, when the lavatory becomes available. In one aspect, application 314 may provide visual indicators (e.g. arrows) that direct the passenger to the lavatory. The visual indicators may be displayed at PED 302 using an aircraft map. The virtual queue for the lavatory is then updated and the process reverts back to block B454.

Figure 4E:
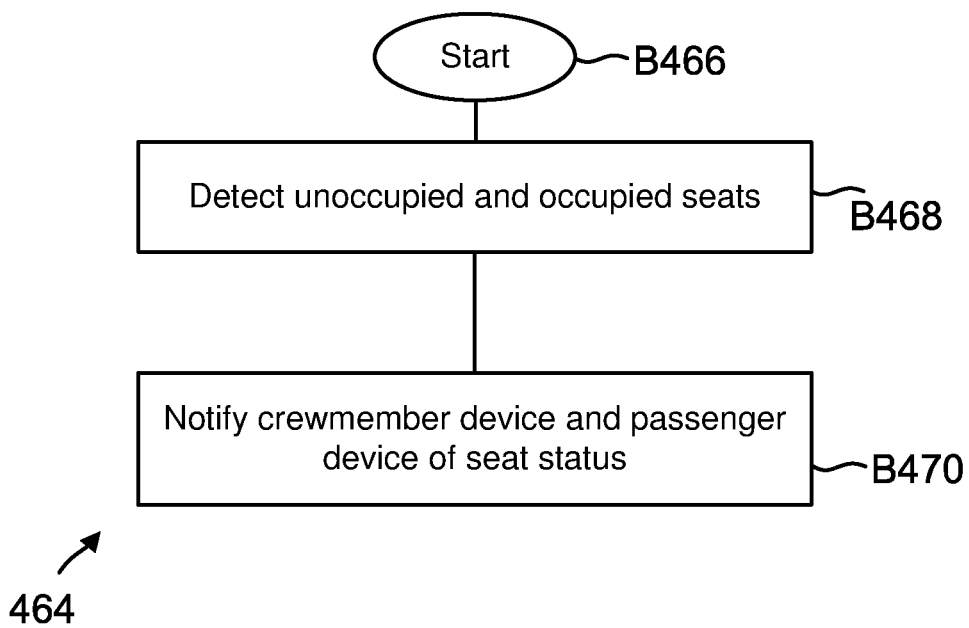
FIG. 4E shows a process flow diagram for managing passenger seats on an aircraft, according to one aspect of the present disclosure.

FIG. 4E shows a process 464, according to one aspect of the present disclosure. Process 464 is performed by executing program instructions out of a memory device. The process begins in block B466, when PED 302, CMD 360, server 354 and seat device 326 have been initialized and are operational. In one aspect, not all the components may be operational, and the innovative technology can be implemented using, for example, the resource tracker 382 that may be executed out of CMD 360, server 354 or seat device 326. The adaptive aspects disclosed herein are not limited to any specific location for executing the code for process 464.

In block B468, the resource tracker 382 detects unoccupied and occupied seats. This may be based on seat sensor data 386A received from weight sensors (not shown) at passenger seats or types of sensors, such as heat, infrared or CCD sensors. The sensor data 386A indicates whether someone is sitting at a seat. The resource tracker 382 may then notify passengers and crew members of the seat status in block B470.

Figure 4F:
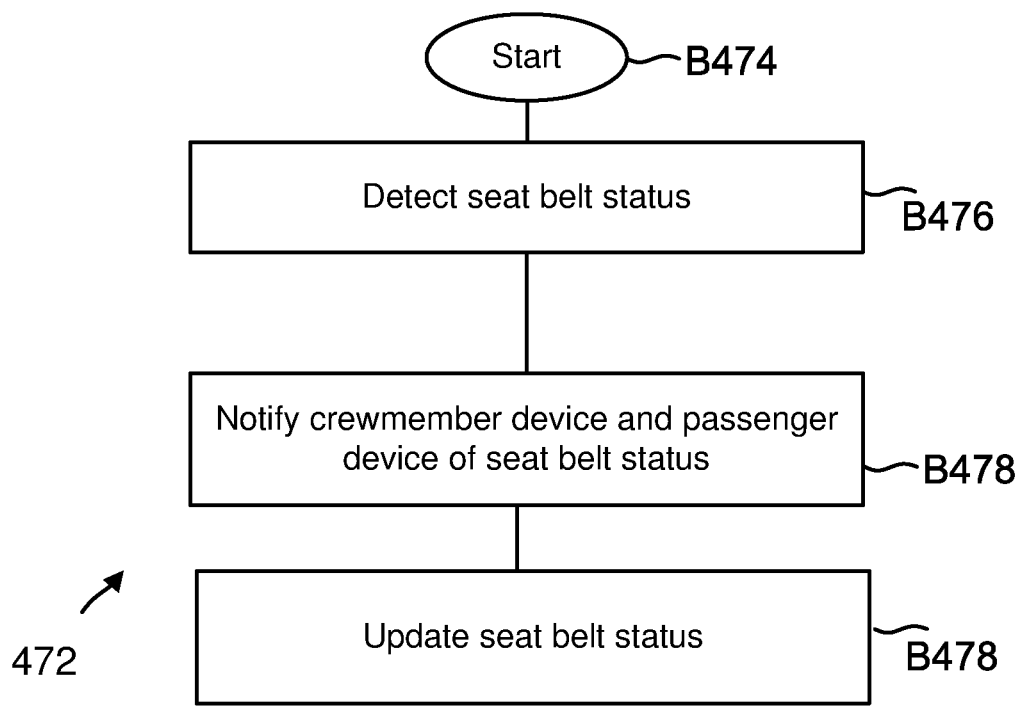
FIG. 4F shows a process flow diagram for managing seat belt use on an aircraft, according to one aspect of the present disclosure.

FIG. 4F shows a process 472, according to one aspect of the present disclosure. Process 472 is performed by executing program instructions out of a memory device. The process begins in block B474, when PED 302, CMD 360, server 354 and seat device 326 have been initialized and are operational. In one aspect, not all the components may be operational, and the innovative technology can be implemented using, for example, the resource tracker 382 that may be executed out of CMD 360, server 354 or seat device 326. The adaptive aspects disclosed herein are not limited to any specific location for executing the code for process 472.

In block B476, the resource tracker 382 detects seat belt status and seat occupied status, i.e. whether the seat belt is engaged or not. This may be based on seat sensor data 386A that notifies the resource tracker 382 when a seat belt is engaged or disengaged. The sensor data 386A is used to maintain data structure 384C that stores indication of seat belt engagement or disengagement. When the seat belt is not engaged, then the passenger PED 302 and/or seat device 326 is notified in block B478. The CMD 360 is also notified. After the notified passenger puts on the seat belt, the seat belt status at the seat status data structure 384C is updated. The process then reverts back to block B476.

In one aspect, the resource tracker 382 uses machine learning to identify passengers that typically do not put their seat belt on. An indicator may be placed at passenger data 352 indicating whether passenger complies with seat belt instructions. When the passenger boards the aircraft, a reminder is sent to PED 302 and/or seat device 326 to remind the passenger to use the seat belt.

Figure 4G:
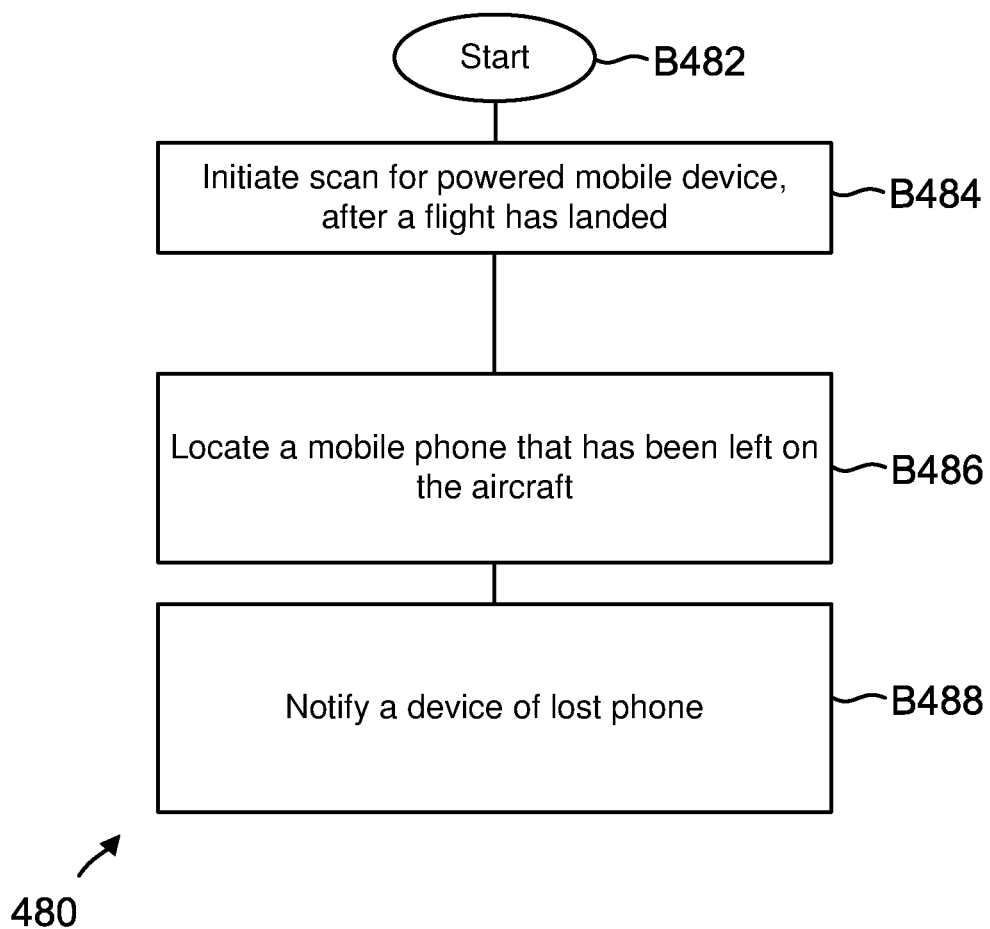
FIG. 4G shows a process flow diagram for detecting a mobile device that has been left on an aircraft, according to one aspect of the present disclosure.

FIG. 4G shows a process 480 for detecting a mobile device left on an aircraft, according to one aspect of the present disclosure. In one aspect, beacons 320A-320N are used to detect any PED 302 with active Bluetooth or Wi-fi interface. After passengers deplane, the resource tracker 382 automatically runs a search and locates any forgotten cell phones and alerts the CMD 360, e.g. "A phone called 'Jim's iPhone' left at seat 26J."

Referring now to FIG. 4G, process 480 is performed by executing program instructions out of a memory device. The process begins in block B482, when PED 302, CMD 360, server 354 and seat device 326 have been initialized and are operational. In one aspect, not all the components may be operational, and the innovative technology can be implemented using, for example, the resource tracker 382 that may be executed out of CMD 360, server 354 or seat device 326. The adaptive aspects disclosed herein are not limited to any specific location for executing the code for process 480.

In block B484, a scan is initiated to locate any powered PEDs 302 (e.g. mobile phones), after a flight has landed. The scan may be initiated by resource tracker 382 or any other application. If a mobile phone has been left, then it is located in block B486. In block B488, a device, e.g. CMD 360 is notified of the mobile phone left on the aircraft.

Figure 4H:
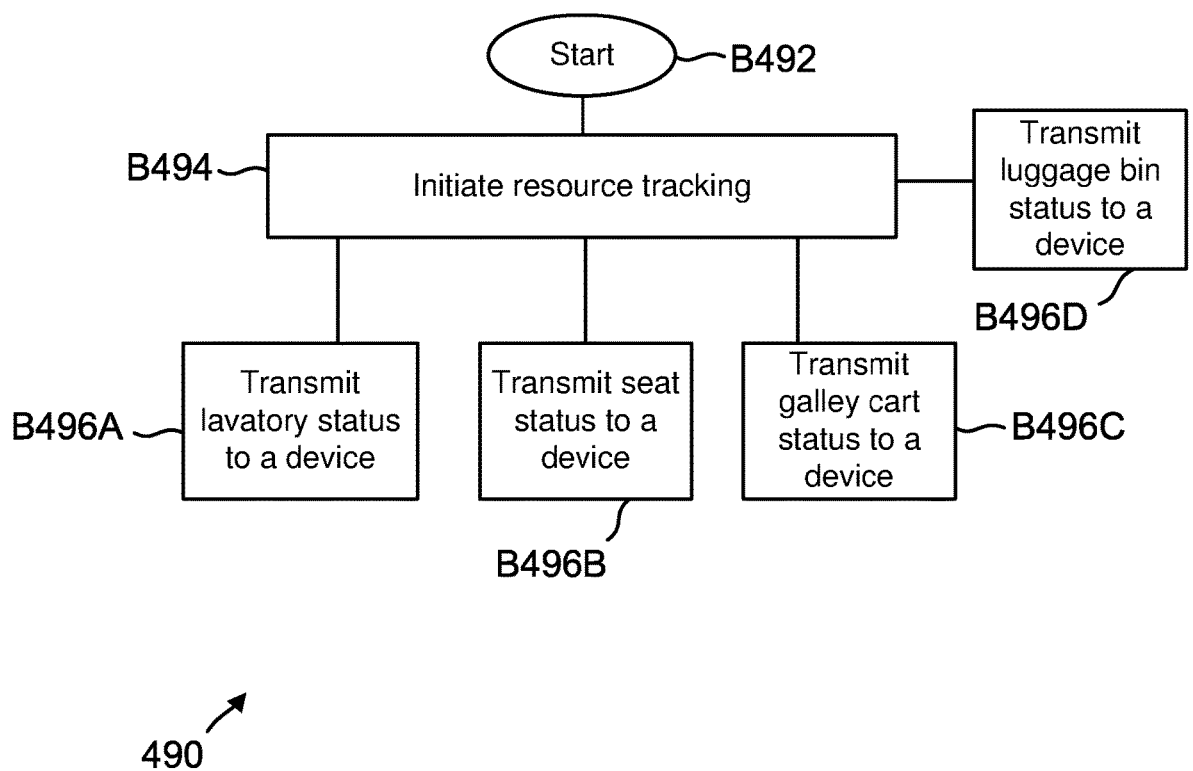
FIG. 4H shows a process flow diagram for resource tracking on an aircraft, according to one aspect of the present disclosure.

FIG. 4H shows a process 490, according to one aspect of the present disclosure. Process 490 is performed by executing program instructions out of a memory device. The process begins in block B492, when PED 302, CMD 360, server 354 and seat device 326 have been initialized and are operational. In one aspect, not all the components may be operational, and the innovative technology can be implemented using, for example, resource tracker 382 that may be executed out of CMD 360, server 354 or seat device 326. The adaptive aspects disclosed herein are not limited to any specific location for executing the code for process 492.

In block B494, resource tracking is initialized by the resource tracker 382. A lavatory status is sent to a device in block B496A. The status is determined by process 450 described above with respect to FIG. 4D. In block B496B, a seat status is sent to a device, based on processes 464 and 472, described above with respect to FIGS. 4E and 4F, respectively. A galley cart status is sent to a device in block B496C. The status is determined by process 400 described above with respect to FIG. 4A. A luggage bin status is sent to a device in block B496D. The status is determined by process 432 described above with respect to FIG. 4C.

Figure 4I:
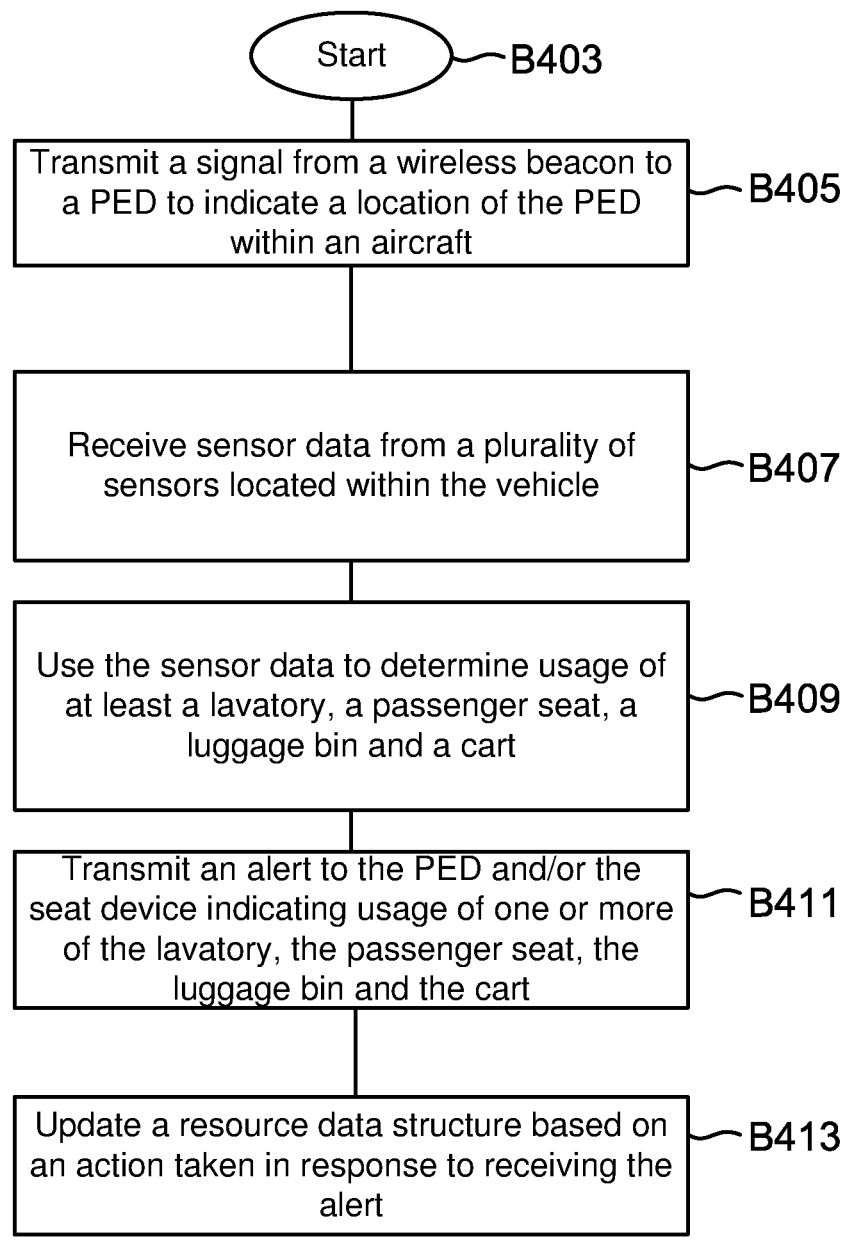
FIG. 4I shows a process flow diagram for managing different resources on an aircraft, according to one aspect of the present disclosure.

FIG. 4I shows a process 401 for managing resources, including a lavatory, a passenger seat, a cart, and a luggage bin on an aircraft, according to one aspect of the present disclosure. Process 401 is performed by executing program instructions out of a memory device. The process begins in block B403, when PED 302, CMD 360, server 354, cart 390 and seat device 326 have been initialized and are operational. In one aspect, not all the components may be operational, and the innovative technology can be implemented using, for example, the resource tracker 382 that may be executed out of CMD 360, server 354 or seat device 326. The adaptive aspects disclosed herein are not limited to any specific location for executing the code for process B401.

In block B405, a signal is transmitted by a wireless beacon 320 to a PED 302 on an aircraft. The signal indicates a location of the PED within the aircraft.

In block B407, sensor data 386 from a plurality of sensors located at different location within the aircraft are received. As an example, sensor data may be received from sensors at the lavatory, passenger seats, cart 390, luggage bins and other location. In block B409, the resource tracker 382 uses the sensor data 386 to automatically determine usage of a lavatory, a passenger seat, a luggage bin, and a cart. In block B411, the resource tracker 382 transmits an alert to the PED 302 indicating usage of one or more of the lavatory, the passenger seat, the luggage bin, and the cart. In one aspect, a virtual queue indicates a position of each passenger waiting to use the lavatory and a message is sent to PED 302 and/or seat device 326 as to who is next in the virtual queue for using the lavatory, based on an indication that the lavatory is unoccupied. The alert for the lavatory may include visual directions to the lavatory on a map of the aircraft. In another aspect, movement of the cart 390 within the aircraft is tracked to provide a time estimate for when the cart 390 is expected to reach a specific passenger seat location.

In block B413, the resource data structure 384 is updated, after an action is taken in response to receiving the alert, e.g. when the passenger occupies the lavatory or engages their seat belt.

Figure 4J:
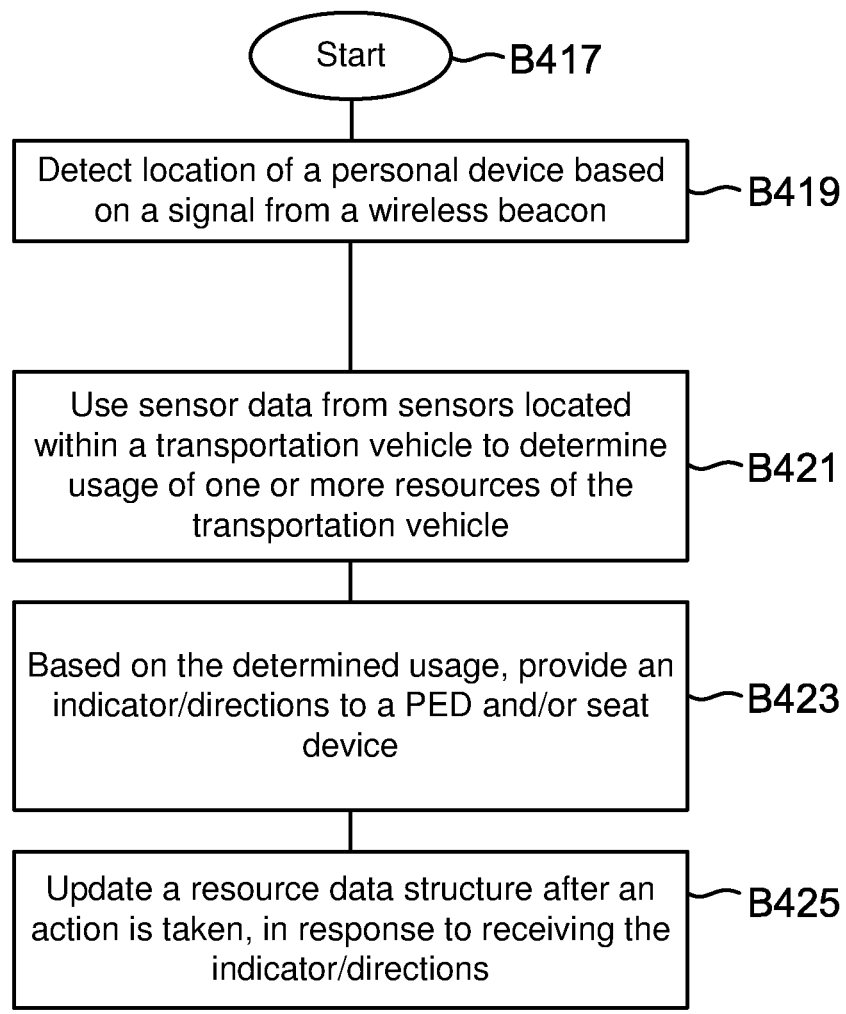
FIG. 4J shows a process flow diagram for managing different resources on a transportation vehicle, according to one aspect of the present disclosure.

FIG. 4J shows a process 415 for managing resources, including a lavatory, a passenger seat, a cart, and a luggage bin on a transportation vehicle, according to one aspect of the present disclosure. Process 415 is performed by executing program instructions out of a memory device. The process begins in block B417, when PED 302, CMD 360, server 354, cart 390 and seat device 326 have been initialized and are operational. In one aspect, not all the components may be operational, and the innovative technology can be implemented using, for example, the resource tracker 382 that may be executed out of CMD 360, server 354 or seat device 326. The adaptive aspects disclosed herein are not limited to any specific location for executing the code for process B415.

In block B419, application 314 detects a location of a PED 302 based on a signal transmitted by a wireless beacon 320 to the PED 302. In block B421, the resource tracker 382 uses sensor data to automatically determine usage of a resource at the transportation vehicle, where the resource includes at least one of a lavatory, a passenger seat, a luggage bin, and a cart used on the transportation vehicle.

In block B423, a status of the resource is provided to the PED 302 and/or seat device 326, based on the determined usage. For example, application 314 provides a visual arrow with directions to the lavatory on a transportation vehicle map, when the lavatory becomes available. In block B425, the resource data structure 384 is updated by the resource tracker 382, after an action associated with the resource is taken, in response to receiving the status.

Figure 5:
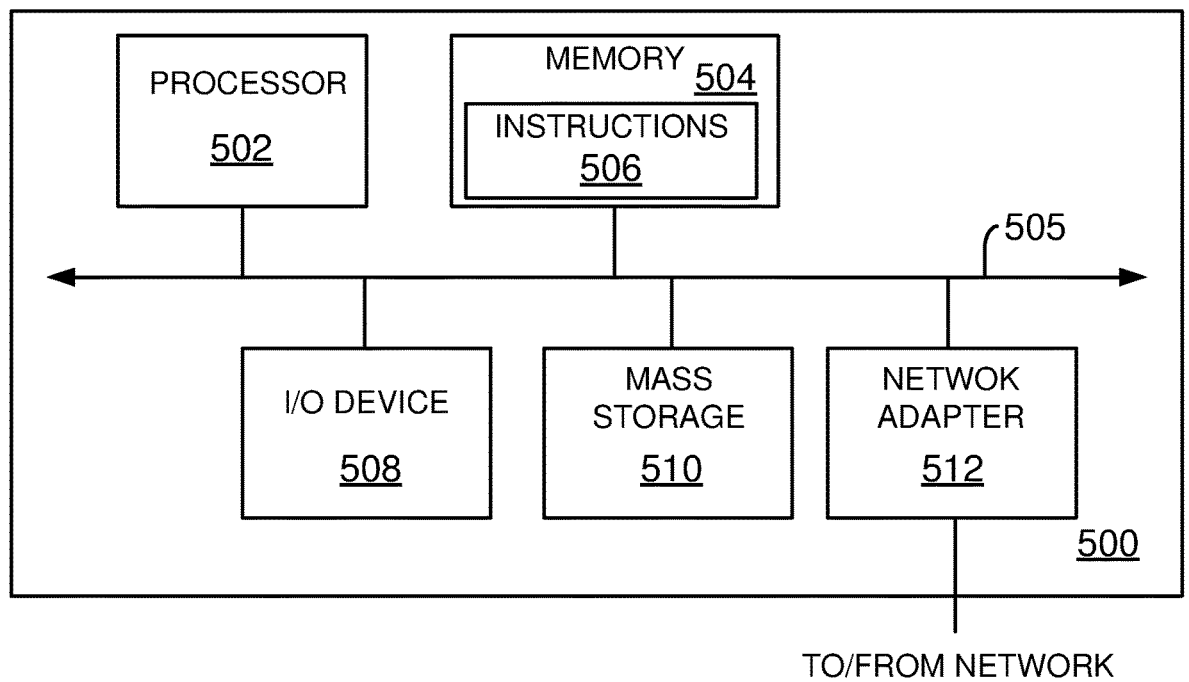
FIG. 5 shows a block diagram of a computing system, used according to one aspect of the present disclosure.

Processing System: FIG. 5 is a high-level block diagram showing an example of the architecture of a processing system 500 that may be used according to one aspect. The processing system 500 can represent a computing system executing resource tracker 382, CMD 360, media server 112, computing system 106, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement resource tracker 382, application 314, data structure 3384 and/or the process steps of FIGS. 4A-4G described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for managing resources on transportation vehicles have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
   detecting location of a personal electronic device (PED) paired with an entertainment system of a transportation vehicle, based on a signal transmitted by a wireless beacon to the PED;
   determining usage of a lavatory on the transportation vehicle, a passenger seat on the transportation vehicle, a luggage bin on the transportation vehicle and a cart used on the transportation vehicle based on sensor data received from a plurality of sensors on the transportation vehicle;
   determining a nearest resource to the detected PED from among the lavatory, the passenger seat, the luggage bin and the cart, based on the detected PED location and a mapping data store of resources on the vehicle, the mapping data store indicating location of the lavatory, the passenger seat, the luggage bin and the cart within the transportation vehicle;
   when the nearest resource is the luggage bin:
      providing to the detected PED, an indication of when the luggage bin is predicted to become full, based on the determined usage and a number of passengers waiting to be seated within an aisle of the transportation vehicle;
   when the nearest resource is the lavatory and the lavatory is occupied:
      providing to the detected PED an estimated time of when the lavatory is likely to become available, based on the determined usage;
   when the nearest resource is the cart:
      providing to the detected PED, based on the determined usage, a predicted a time estimate of when the cart is likely to reach a passenger seat associated with the detected PED, the cart carrying a plurality of items;
      transmitting to the detected PED, information regarding one or more items on the cart preferred by a passenger of the passenger seat associated with the detected PED; and
      suggesting an alternative item to the detected PED, when a passenger preferred item is likely to become unavailable; and
   when the nearest resource is the passenger seat:
   indicating to the detected PED, whether the passenger seat is occupied or unoccupied, based on the determined usage; and
   updating a data store tracking the determined usage of the lavatory, the passenger seat, the luggage bin and the cart, after change in the determined usage of one or more of the lavatory, the passenger seat, the luggage bin and the cart.

2. The method of claim 1, further comprising: identifying from a data structure that the passenger associated with the detected PED has a history of not engaging seat belts.

3. The method of claim 1, further comprising: tracking a movement of the cart within the transportation vehicle to provide the time estimate for when the cart is estimated to reach the passenger seat associated with the detected PED.

4. The method of claim 1, further comprising: tracking inventory of items on the cart and notifying the detected PED of the passenger preferred item in the inventory, prior to the cart reaching the passenger seat associated with the detected PED, wherein passenger preference for the preferred item is determined from a data structure storing passenger related information.

5. The method of claim 1, further comprising: upon determining that luggage bin space on the transportation vehicle is predicted to become full, notifying a crew device to automatically initiate bag check.

6. The method of claim 2, further comprising: providing a reminder to the detected PED for the passenger to use a seat belt at the passenger seat associated with the detected PED, when the passenger boards the transportation vehicle.

7. The method of claim 1, wherein the transportation vehicle is one of an aircraft, a train, a bus or a ship, and the data store is at least one of a data structure and database.

8. A non-transitory machine readable medium having stored thereon instructions for performing a method comprising machine executable code, which when executed by at least one machine, causes the machine to:
   detect location of a personal electronic device (PED) paired with an entertainment system of a transportation vehicle, based on a signal transmitted by a wireless beacon to the PED;
   determine usage of a lavatory on the transportation vehicle, a passenger seat on the transportation vehicle, a luggage bin on the transportation vehicle, and a cart used on the transportation vehicle, based on sensor data received from a plurality of sensors on the transportation vehicle;
   determine a nearest resource to the detected PED from among the lavatory, the passenger seat, the luggage bin and the cart, based on the detected PED location and a mapping data store of resources on the vehicle, the mapping data store indicating location of the lavatory, the passenger seat, the luggage bin and the cart within the transportation vehicle;
   when the nearest resource is the luggage bin:
      provide to the detected PED, an indication of when the luggage bin is predicted to become full, based on the determined usage and a number of passengers waiting to be seated within an aisle of the transportation vehicle;
   when the nearest resource is the lavatory and the lavatory is occupied:
      provide to the detected PED an estimated time of when the lavatory is likely to become available, based on the determined usage;
   when the nearest resource is the cart:
      provide to the detected PED, based on the determined usage, a predicted a time estimate when the cart is likely to reach a passenger seat associated with the detected PED, the cart carrying a plurality of items;
      transmit to the detected PED, information regarding one or more items on the cart preferred by a passenger of the passenger seat associated with the detected PED; and
      suggest an alternative item to the detected PED, when a passenger preferred item is likely to become unavailable; and
   when the nearest resource is the passenger seat:
      indicate to the detected PED, whether the passenger seat is occupied or unoccupied, based on the determined usage; and
      update a data store tracking the determined usage of the lavatory, the passenger seat, the luggage bin and the cart, after change in the determined usage of one or more of the lavatory, the passenger seat, the luggage bin and the cart.

9. The non-transitory machine readable medium of claim 8, wherein the machine executable code further causes the machine to: identify from a data structure that the passenger associated with the detected PED has a history of not engaging seat belts.

10. The non-transitory machine readable medium of claim 8, wherein the machine executable code further causes the machine to: track a movement of the cart within the transportation vehicle to provide the time estimate for when the cart is estimated to reach the passenger seat associated with the detected PED.

11. The non-transitory machine readable medium of claim 8, wherein the machine executable code further causes the machine to: track inventory of items on the cart; and notify the detected PED of a passenger preferred item in the inventory, prior to the cart reaching the passenger seat associated with the detected PED, wherein passenger preference is determined from a data structure storing passenger related information.

12. The non-transitory machine readable medium of claim 8, wherein the machine executable code further causes the machine to: upon determining that luggage bin space on the transportation vehicle is predicted to become full, notify a crew device to automatically initiate bag check.

13. The non-transitory machine readable medium of claim 9, wherein the machine executable code further causes the machine to: provide a reminder to the detected PED, for the passenger to use a seat belt at the passenger seat associated with the detected PED, when the passenger boards the transportation vehicle.

14. The non-transitory machine readable medium of claim 8, wherein the transportation vehicle is one of an aircraft, a train, a bus or a ship, and the storage device stores data regarding availability of the resource.

15. A method, comprising:
transmitting a signal by wireless beacon to a personal electronic device (PED) paired with an in-flight entertainment system of an aircraft, the signal indicating a location of the PED within the aircraft;
receiving sensor data from a plurality of sensors located at different locations within the aircraft;
determining usage of a lavatory, a passenger seat, a luggage bin, and a cart used on the aircraft, based on the sensor data;
determining a nearest resource from among the lavatory, the passenger seat, the luggage bin, and the cart to the detected PED, based on detected PED location and a mapping data store of resources on the aircraft, the mapping data store indicating location of the lavatory, the passenger seat, the luggage bin and the cart within the aircraft;
transmitting an alert to the PED indicating usage of the nearest resource from among one or more of the lavatory, the passenger seat, the luggage bin, and the cart;

wherein when the nearest resource is the luggage bin, the alert indicating when the luggage bin is predicted to become full, based on the determined usage and a number of passengers waiting to be seated within an aisle of the transportation vehicle;
wherein when the lavatory is occupied and the lavatory is the nearest resource, the alert indicating to the detected PED an estimated time of when the lavatory is likely to become available;
wherein when the nearest resource is the cart:
the alert to the detected PED, providing a predicted a time estimate when the cart is likely to reach a passenger seat associated with the detected PED, the cart carrying a plurality of items; the alert including information regarding one or more items on the cart preferred by a passenger of the passenger seat associated with the detected PED; and suggesting an alternative item to the detected PED, when a passenger preferred item is likely to become unavailable;
wherein when the nearest resource is the passenger seat:
based on the determined usage, the alert indicating to the detected PED, whether the passenger seat is occupied or unoccupied; and
update a data store for tracking the determined usage of the lavatory, the passenger seat, the luggage bin, and the cart, after change in the determined usage of one or more of the lavatory, the passenger seat, the luggage bin and the cart.

16. The method of claim 15, wherein the estimated time of when the lavatory is likely to become available is based on lavatory usage on different aircraft routes.

17. The method of claim 15, further comprising: identifying from a data structure that the passenger associated with the detected PED has a history of not engaging seat belts.

18. The method of claim 17, further comprising: the alert providing a reminder to the detected PED for the passenger to use a seat belt at the passenger seat, associated with the detected PED, when the passenger boards the aircraft.

19. The method of claim 15, further comprising: upon determining that luggage bin space on the transportation vehicle is predicted to become full, the alert notifying a crew device to automatically initiate bag check.

20. The method of claim 15, further comprising:
initiating a scan for PEDs after a flight has landed;
detecting the location of a PED that has been left on the aircraft; and
notifying a device of the PED's location.

* * * * *